(No Model.)  3 Sheets—Sheet 1.
W. I. CALVER.
SEAT AND LUGGAGE CARRIER ATTACHMENT FOR BICYCLES.
No. 477,042.  Patented June 14, 1892.
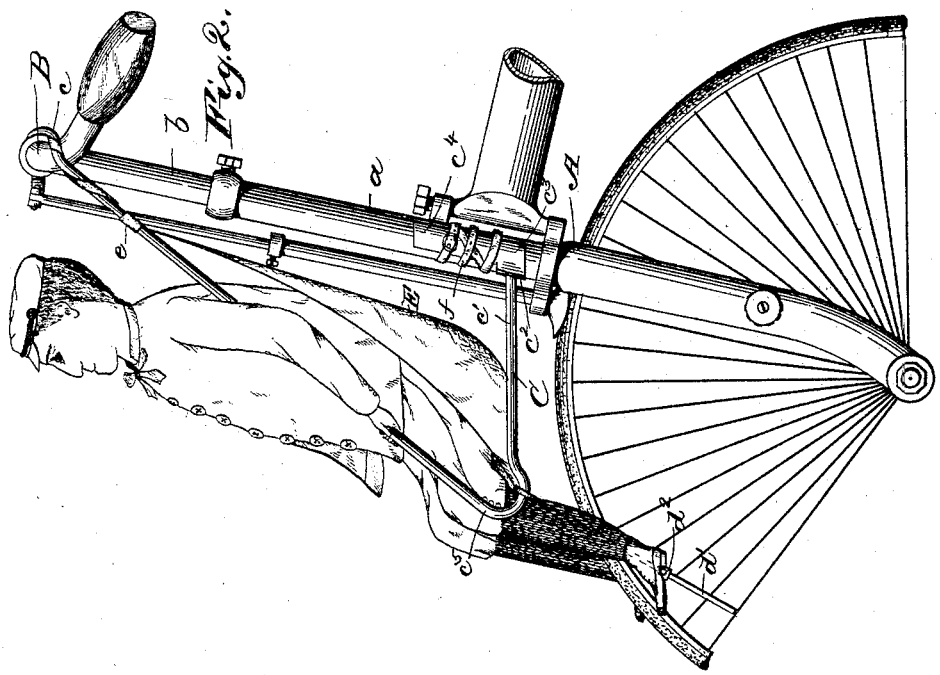
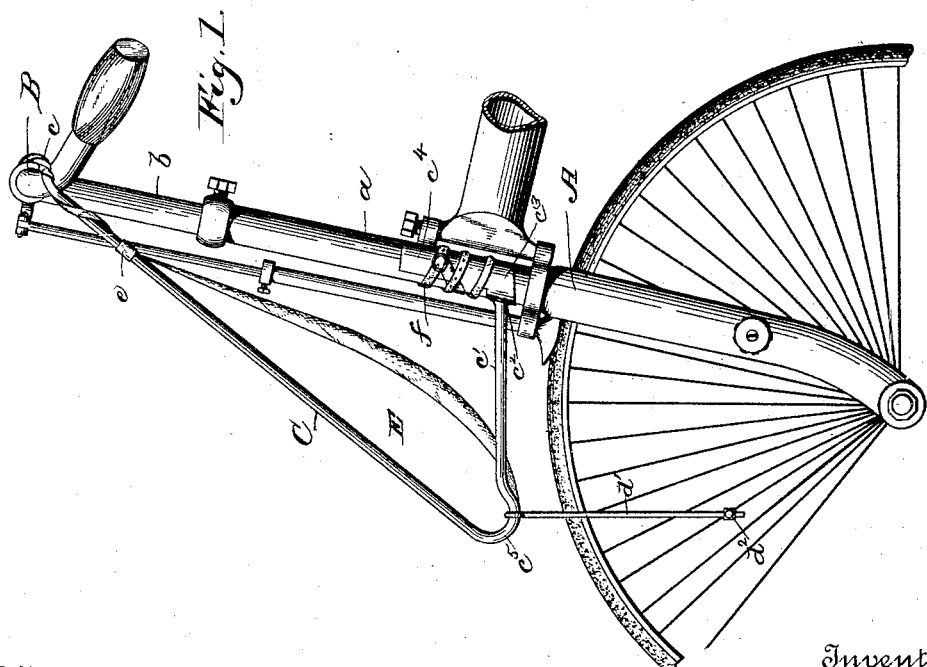

(No Model.) 3 Sheets—Sheet 2.
W. I. CALVER.
SEAT AND LUGGAGE CARRIER ATTACHMENT FOR BICYCLES.
No. 477,042. Patented June 14, 1892.
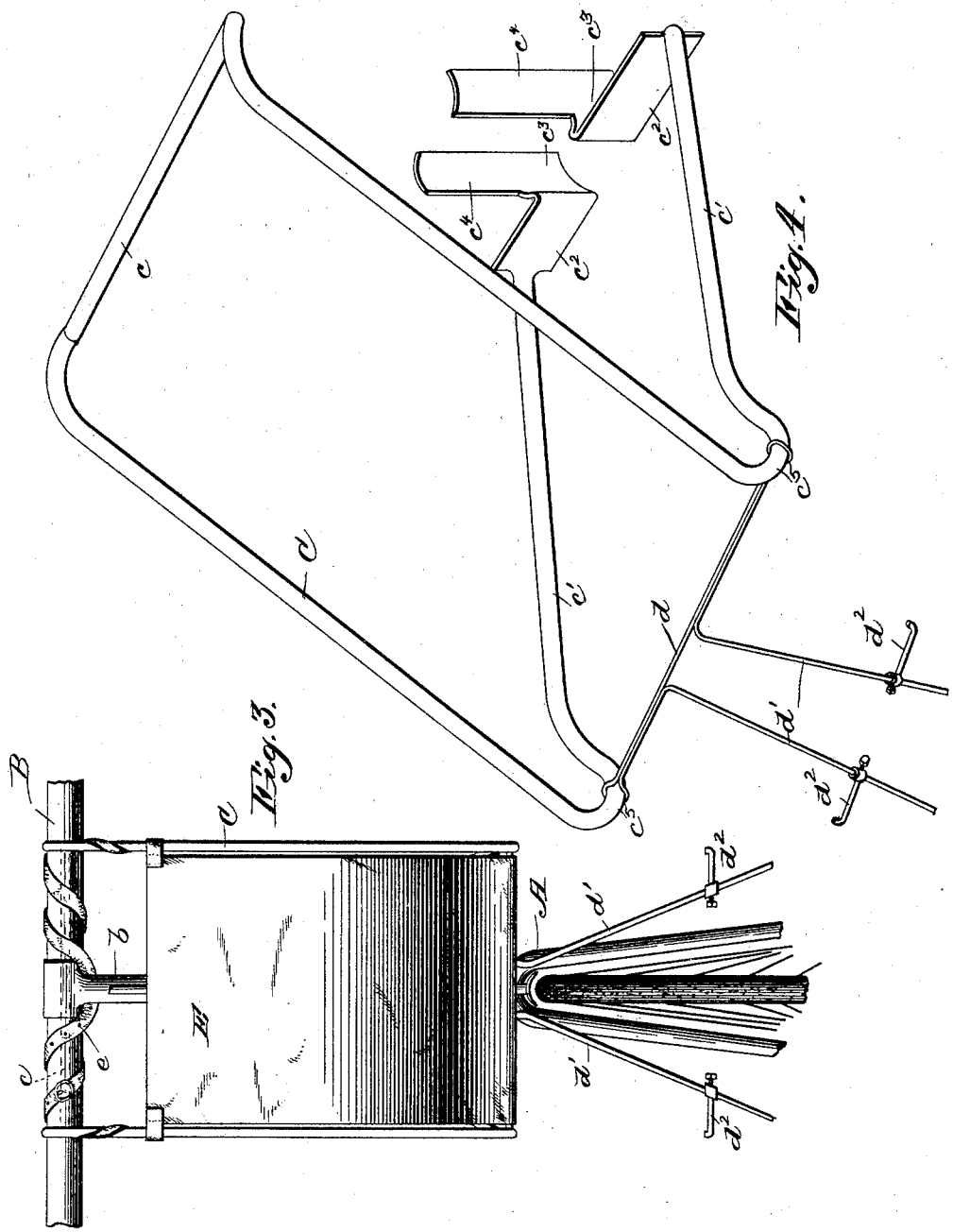
Witnesses
A. T. Cushman.
C. M. Sweeney.
Inventor.
W. Irving Calver,
by MacLeod, Calver & Randall
his Attorneys (No Model.) 3 Sheets—Sheet 3.

W. I. CALVER.
SEAT AND LUGGAGE CARRIER ATTACHMENT FOR BICYCLES.

No. 477,042. Patented June 14, 1892.

UNITED STATES PATENT OFFICE.

WASHINGTON IRVING CALVER, OF HAGERSTOWN, MARYLAND, ASSIGNOR OF ONE-HALF TO A. W. MILLER, OF SAME PLACE.

SEAT AND LUGGAGE-CARRIER ATTACHMENT FOR BICYCLES.

SPECIFICATION forming part of Letters Patent No. 477,042, dated June 14, 1892.

Application filed January 11, 1892. Serial No. 417,704. (No model.)

*To all whom it may concern:*

Be it known that I, WASHINGTON IRVING CALVER, a citizen of the United States, residing at Hagerstown, in the county of Washington and State of Maryland, have invented certain new and useful Improvements in Children's Seat and Luggage-Carrier Attachments for Bicycles, of which the following is a specification, reference being had therein to the accompanying drawings.

My invention has for its object to provide an attachment for bicycles which will afford a convenient seat for a child and which may also be utilized as a luggage or package carrier. To this end I construct a frame-work consisting, preferably, of a single piece of wire suitably bent to be attached at its top to the handle-bar of the machine and having a portion of its other part hammered out or otherwise flattened and bent into suitable shape for attachment to the post or standard extending upward from the front fork of the vehicle. To this wire frame is attached a second piece of wire bent in such shape as to afford a suitable support for the lower end of the fabric, forming the seat for the attachment, and which has depending portions to which the child's foot-rests are secured. This foot-rest portion of the attachment is adapted to be turned up in such a way as to be utilized for holding the luggage-receptacle in place, or as a support for packages which may be secured to or be sustained by the seat attachment.

Figure 5:
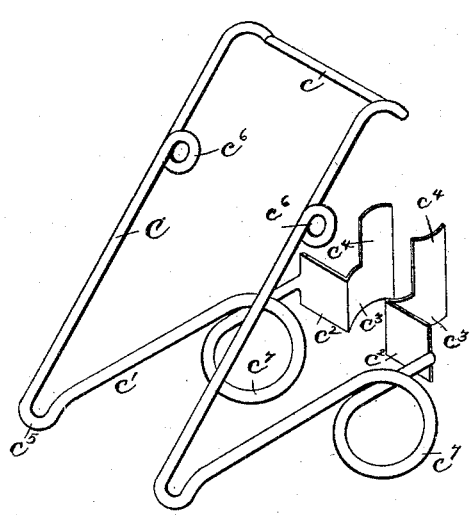
Figure 6:
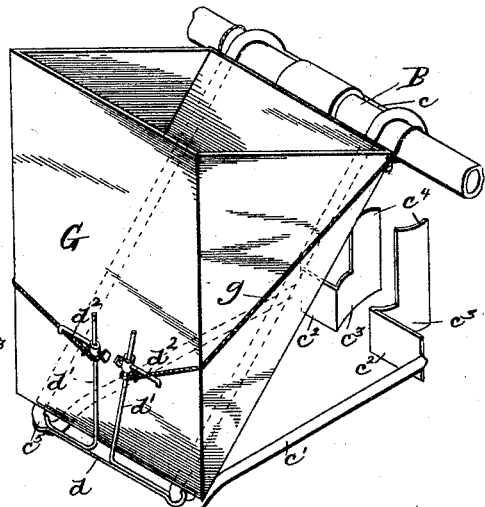
Figure 7:
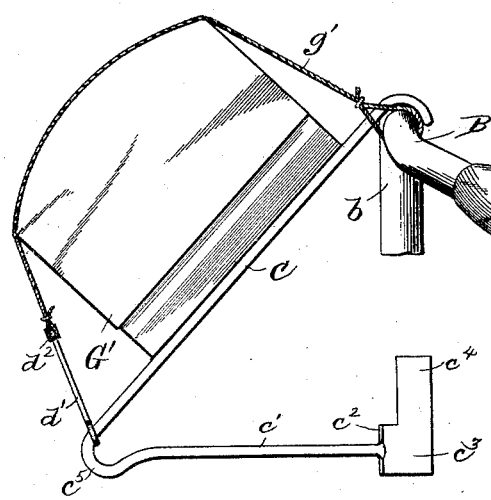
Figure 8:
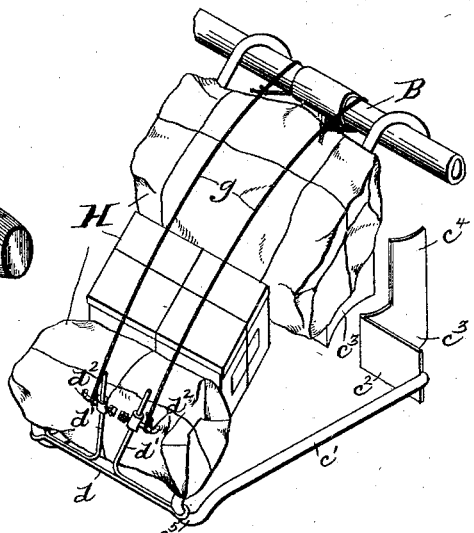

In the accompanying drawings, Figure 1 is a side view representing a part of the front portion of a bicycle with my improved seat attachment secured thereto. Fig. 2 is a similar view representing a child sitting in the seat. Fig. 3 is a partial front view of a bicycle representing the seat in operative position. Fig. 4 is a perspective view showing the frame-work of the seat attachment in detail and also the foot-rest portion thereof. Fig. 5 is a view similar to Fig. 4, showing a slightly-modified construction. Figs. 6, 7, and 8 are detail views to illustrate the use of my invention.

A denotes a portion of the front fork of the bicycle, and $a$ the hollow post or standard thereof, in which is inserted the depending portion $b$ of the handle-bar B.

C denotes a metallic frame, preferably constructed from a single piece of wire and being provided at its upper end with connected bent portions or hooks $c$, adapted to engage the horizontal handle-bar B. The wire frame C is provided at its lower end with rearwardly-extending arms $c'$, the inwardly-extending ends $c^2$ of which are preferably flattened, as shown, and provided with ears $c^3$, rounded to fit against the post or standard $a$ of the front fork, and also provided with vertical portions $c^4$ to rest against said post or standard. To the loops $c^5$, connecting the inclined arms of the frame C with the rearwardly-extending arms $c^2$ thereof, is attached a smaller wire frame consisting of a horizontal portion $d$, provided with eyes encircling the loops $c^5$ and having depending portions $d'$, to the lower ends of which are secured the foot-rests $d^2$, said foot-rests being preferably vertically adjustable.

E represents the seat portion of the attachment, said seat portion consisting, preferably, of a piece of canvas or other suitable fabric attached at its upper end to the frame C by straps $e$, which are wound about the portions of the said frame and also about the handle-bar B, so as to secure the upper part of the seat attachment in proper position on the bicycle. The seat E is secured at its lower end to the horizontal portion $d$ of the foot-rest frame. The lower portion of this seat attachment is preferably secured to the standard of the front fork by the strap $f$, which is lashed about the upright portions or arms $c^4$ of the supporting-frame. To prevent scratching of the vertical post of the front fork by the parts of the attachment which are in contact therewith, the inside faces of the said parts may be lined with leather or other suitable soft material, or a piece of such material may be placed around the said post, and similar provisions may also be made to prevent the handle-bar from being scratched by the hooks at the upper part of the frame, which are in contact therewith.

From the foregoing it will be seen that I provide a convenient seat attachment which is supported entirely by the steering-head of the machine without being attached to said head below the top of the front fork, and also that I provide a seat attachment of simple construction in that the entire frame-work thereof, including the foot-rest portion, consists of but two pieces of wire suitably bent and shaped. The vertically-adjustable foot-rests $d^2$ are also convenient in that they adapt the said attachment to children of different sizes.

My seat attachment, as shown in Figs. 1, 2, 3, and 4, is sufficiently elastic for all practical purposes, particularly when used on bicycles having cushioned or pneumatic tires; but if it be desired to render the said seat attachment more yielding or elastic the frame-work thereof may be constructed as shown in Fig. 5, with loops or bends $c^6 c^7$ to add to the resilience of the frame.

In using my improved seat attachment as a luggage-carrier it may be provided with a triangular basket G, Fig. 6, secured in place by turning up the depending portions of the foot-rest and holding said depending portions in place by straps $g$, secured thereto and to the frame C; but instead of the basket G an extensible packing-case G', as represented in Fig. 7, may be employed. In this case the foot-rest portions of the attachment are also utilized to hold the packing-case in place with the assistance of the straps $g'$, running over the case and extending up to the handle-bar of the machine.

Fig. 8 shows the seat attachment in use as a luggage-carrier without any special receptacle, the packages or bundles H being held in place by the straps $g$, running from the foot-rest portion of the attachment over to the frame C.

Having thus described my invention, I claim and desire to secure by Letters Patent—

1. A seat attachment for bicycles, consisting of a frame-work constructed from a single piece of metal with rearwardly-extending arms for attachment to the post of the front fork of a bicycle, said frame-work being provided with a seat-holding and foot-rest portion consisting of a piece of bent wire having eyes engaged with loops of the seat attachment and having depending portions provided with foot-rests.

2. The combination, with the frame C, provided with rearwardly-extending arms $c'$ for connection with the post of the front fork of the bicycle and with loops $c^5$, of the seat-holding foot-rest frame having a horizontal portion engaged with the said loops $c^5$ and provided with depending arms $d'$, having vertically-adjustable foot-rests $d^2$.

3. A seat attachment for a bicycle, consisting of a wire frame-work C, provided at its front lower portion with a foot-rest frame adapted to be turned up, and thus serve as a support for a luggage-carrier or for packages to be sustained by said seat attachment.

4. The combination, with the frame C, consisting of a single piece of metal and provided with rearwardly-extending arms for engagement with the post of the front fork of a bicycle, of a foot-rest frame consisting of a horizontal portion $d$ and depending arms $d'$, said arms being provided with suitable foot-rests.

In testimony whereof I affix my signature in presence of two witnesses.

W. IRVING CALVER.

Witnesses:
HENRY CALVER,
CHAS. F. RANDALL.